United States Patent [19]

Orr, Jr. et al.

[11] 4,095,115
[45] June 13, 1978

[54] OZONE GENERATION APPARATUS AND METHOD

[75] Inventors: F. D. Orr, Jr.; L. F. Templeton; Larry L. Keutzer, all of Austin, Tex.

[73] Assignee: Accelerators, Inc., Austin, Tex.

[21] Appl. No.: 754,615

[22] Filed: Dec. 27, 1976

[51] Int. Cl.² ............................................. C01B 13/00
[52] U.S. Cl. .................................. 250/538; 204/176; 250/427; 250/432 R; 250/492 R; 250/531; 250/532
[58] Field of Search ............... 250/531, 532, 538, 427, 250/492 B; 204/176

[56] References Cited

U.S. PATENT DOCUMENTS

| | | | |
|---|---|---|---|
| 3,702,973 | 11/1972 | Daugherty et al. | 204/176 |
| 3,831,052 | 8/1974 | Knechtli | 313/209 |
| 3,883,413 | 5/1975 | Douglas-Hamilton | 204/176 |
| 3,970,892 | 7/1976 | Wakalopulos | 315/111.3 |

*Primary Examiner*—Benjamin R. Padgett
*Assistant Examiner*—Deborah L. Kyle
*Attorney, Agent, or Firm*—Arnold, White & Durkee

[57] ABSTRACT

The invention provides a method and apparatus for generating large quantities of singlet oxygen and/or ozone at unexpectedly high efficiencies. An electron beam generated by a hollow cathode plasma discharge device (HCD) is spread by disclosed means over an electron-transmissive window past which is flowing an oxygen-containing atmosphere at a high velocity.

10 Claims, 2 Drawing Figures

OZONE GENERATION APPARATUS AND METHOD

BACKGROUND OF THE INVENTION

This invention relates generally to apparatus and methods for the generation of singlet oxygen atoms which may combine with oxygen molecules to produce ozone. For the purpose of describing this invention, the term "ozone" includes both singlet oxygen and $O_3$ molecules. In particular, the invention is directed to apparatus in which a high energy electron beam generated by a hollow cathode plasma discharge device is directed into an oxygen-containing atmosphere moving at a high velocity to produce substantial quantities of ozone at high efficiency and to methods of ozone generation using electron beams. The invention is particularly adapted for use in sewage treatment, odor and color removal, water and air purification, the removal of hydrogen sulfide from stack gases, and other instances in which environmental wastes may be removed by oxidation with ozone, as well as in oxidation of chemicals used in maufacturing or produced by manufacturing processes.

Methods of treating waste water, sewage, drinking water, environmental air and industrial stack gases for disinfection and for removing impurities by oxidation have long been known. Chlorine, the most prevalent oxidizing disinfectant, causes oxidation in water by forming hypochlorous acid, HOCl, in which the singlet oxygen atom is the oxidizing agent. Another source of singlet, or nascent, oxygen is ozone, which can be made in unlimited supply from air and which does not produce long-lasting toxic by-products such as the carcinogenic chloramines produced by chlorine.

In the past, the most efficient method for generating commercial quantities of ozone used silent electrical discharge, but this method has a number of disadvantages which result in relatively low ozone generation efficiency. One such disadvantage is the requirement that substantially dry air or oxygen be used. The silent discharge method theoretically produces ozone from pure $O_2$ at yields up to about 150 g/kwh, or about 3 kwh consumed for each pound of ozone molecules produced. The optimum yields from air are considerably less, being about 12 kwh/lb $O_3$. These disadvantages make the use of the silent discharge method for the generation of ozone in situ at water purification plants and in stack gas scrubbers unsuitable for large scale use at a cost competitive with chlorine.

The use of electron beams directed into oxygen to produce singlet oxygen atoms which combine with $O_2$ molecules to produce ozone has been proposed in U.S. Pat. Nos. 3,883,413 and 3,702,973. These patents disclose the use of thermionic electron guns to produce beams of electrons which collide with oxygen molecules, dissociating them and forming secondary electrons and ion pairs. The efficiency of ozone generation disclosed in U.S. Pat. No. 3,883,413, namely 3 kwh/lb $O_3$, represents only an ideal design parameter which is markedly inferior to the actual efficiencies observed in apparatus according to our invention. Thermionic electron guns, however, require maintenance of very low pressure around the thermionic emitter, on the order of 0.001 micron, and are readily susceptible to cathode poisoning. The pumping required to maintain this very low pressure reduces the overall efficiency of the thermionic gun when adapted for use in an ozone generator.

Recently, the hollow cathode plasma discharge device has been available as a source of high energy electron beams. Hollow cathode plasma discharge device (HCD) are disclosed in U.S. Pat. Nos. 3,831,052 and 3,970,892. Our invention employs a HCD in which the electron beam is intentionally spread out to cover the window separating the vacuum enclosure of the HCD from the atmosphere. Our invention does not require the uniformity in the electron beam required in the laser keying and electron irradiation uses disclosed in U.S. Pat. Nos. 3,831,052 and 3,970,892. The HCD is particularly advantageous as a source of electrons for field use as it is relatively small in size, does not use delicate filaments for generating electrons, and is simple of construction with considerable ease of maintenance.

SUMMARY OF THE INVENTION

An apparatus for generating ozone has been devised having a vessel enclosing a volume maintained at an appropriate subatmospheric pressure, and wherein a hollow cathode plasma discharge device is disposed for producing a high energy beam of electrons. A suitable electron-transmissive window is provided in the wall of the vessel, communicating with an oxygen-containing atmosphere. The invention further provides means within the vessel for spreading the beam of electrons produced by the hollow cathode discharge device over substantially the entire surface of the electron-transmissive window and means for moving the oxygen-containing atmosphere past the window an appropriate distance from the surface thereof at velocities in excess of about 4,000 ft. per minute. The invention also relates to methods for generating ozone by directing a diffuse beam of high energy electrons into an oxygen-containing atmosphere moving at a high velocity.

One of the main features of this invention is the provision of a high efficiency ozone generator for use in sewage treatment, odor and color removal, air and water purification, and the removal of hydrogen sulfide from stack gases, as well as other applications for oxidation.

Another feature of this invention is the provision of an ozone generator which does not require dry air or an oxygen-enriched atmosphere for efficient ozone generation.

Further features of this invention are the provision of an ozone generator of high reliability which is relatively small in size and weight for use in the field and which may be maintained by relatively unskilled personnel.

This invention also provides an ozone generator which produces ozone efficiently at high rates of air flow.

These features and other advantages of our invention will be apparent to persons skilled in this art from reading the specification and the claims appended hereto.

DESCRIPTION OF THE PREFERRED EMBODIMENT

Figure 1:
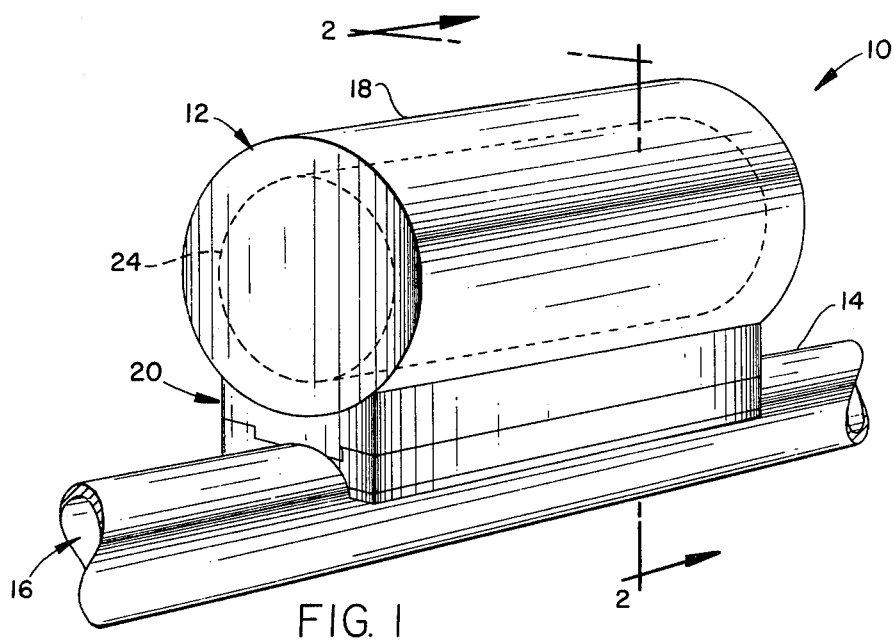
FIG. 1 is a perspective view of an ozone generating apparatus comprising a hollow cathode plasma discharge device contained within a vacuum vessel attached to gas handling means, in accordance with this invention.

In FIG. 1, the ozone generator 10 comprises a vessel 18 enclosing a hollow cathode plasma discharge device 12 shown as attached to a duct 14 containing an oxygen-containing atmosphere 16. The duct may be any suitable air or gas handling apparatus and may have conventional blower means (not shown) to move the air or other oxygen-containing gas through the duct if the ambient atmosphere lacks sufficient velocity. In one particular embodiment the duct 14 may be the plenum chamber of a gas scrubbing apparatus such as disclosed in U.S. Pat. No. 3,761,065.

Figure 2:
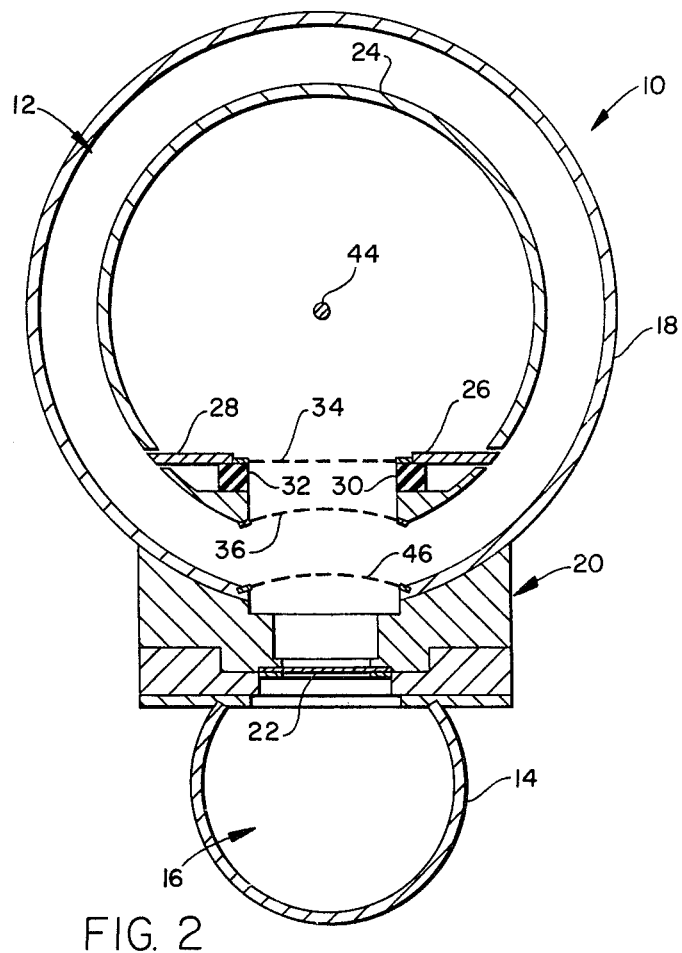
FIG. 2 is an enlarged section taken generally along the line 2—2 of FIG. 1.

FIG. 2 shows in schematic form the orientation of the respective parts of the hollow cathode plasma discharge device 12 as used in conjunction with the duct 14. The vessel 18, which forms the outer housing of the hollow cathode plasma discharge device 12, serves to provide an evacuated volume which may be maintained with a suitable vacuum pump at a pressure between about 1 micron and about 1,000 microns. We have found that a pressure range of between about 5 and about 50 microns will provide the optimum combination of effectiveness and low cost.

To one side of the vessel 18 is attached an adapter wall 20 embedded in the vessel 18, which connects with the duct 14. Adapter wall 20 carries a thin foil section 22 which serves an an electron-transmissive window for the electron beam produced by the hollow cathode plasma discharge device. The thin foil section 22, which must be strong enough to maintain the pressure integrity of the vessel, may be composed of aluminum, titanium, beryllium, or any other material having suitable transmission characteristics. Because of its cost and availability the preferred composition of the foil section in aluminum of thickness between 0.5 and 1.0 mil. The transparency of 1.0 mil aluminum foil to electrons, for example, increases from about 62% at 100 kilovolts electron energy to about 96% at 180 kilovolts.

Hollow cathode 24 is mounted within vessel 18 on suitable electrically insulated structural supports (not shown). Hollow cathode 24 carries webs 26 and 28, on which are mounted insulators 30 and 32. On the inside surface of insulators 30 and 32, there is mounted a perforated anode 34 toward the interior of hollow cathode 24. On the other side of insulators 30 and 32 is mounted a perforated concave control grid 36. The thin foil section 22 is in line with and faces the perforated anode 34 and the control grid 36.

Positioned between the control grid 37 and the window 22 is another anode grid 46 which is maintained at ground potential, the same potential as window 22. Anode grid 46 has the same concave curvature as control grid 36. The potential difference between control grid 36 and anode grid 46 accelerates the electrons extracted from the interior of the hollow cathode 24 toward the window 22. The structure of hollow cathode plasma discharge device 12 also includes an ignition electrode 44, which is preferably in the form of a thin wire extending substantially to the center of the cathode space. When the hollow cathode 24 is in the form of an elongated tube, as is shown, the ignition electrode usually extends along the length of the structure.

A more detailed description of a hollow cathode plasma discharge device suitable for use in this invention may be found in U.S. Pat. No. 3,831,052, the disclosure of which is incorporated herein by reference. The details of connection of power supplies to the hollow cathode discharge device 12, the methods of constructing vessel 18, and the choice of compositions for the vessel 18, wall 20, and duct 14, as well as for the ignition electrode 44 and hollow cathode 24, are conventional and well within the ordinary skill of the art.

While the apparatus of our invention is in operation, depending on the power density of the electron beam, cooling for the thin foil section 22 can be provided by running cooling water through passages (not shown) in the walls supporting the foil section. Such cooling is conventional in this art. Some heat is carried away from the window by the oxygen-containing atmosphere passing by it, but additional cooling, as with water, may be necessary. Some of the problems attendant to window heating by the electron beam can be ameliorated by directing the beam at the window in short pulses. We have employed pulses of between about 50 and about 800 milliseconds duration each with an interval between each pulse of between about 20 and about 200 milliseconds, but we have observed that pulsing the electron beam at short durations with long intervals between pulses reduces ozone generating efficiency. The use of long pulses with short intervals between them stabilizes ozone output. In the pulsed mode of HCD operation the optimum duty cycle range is above about 60 percent "on."

The control grid 36 and the perforated anode 34 extract electrons from the interior of the region enclosed by the HCD and allow the electrons to pass toward the anode grid 46, and through it toward the window 22. The control grid 36 and the anode grid 46 act in combination to spread the beam of electrons substantially over the entire surface of the thin foil section 22. In an alternate embodiment of this invention, we have employed controlled magnetic focusing/scanning rings in addition to the control grid 36, to take the beam of electrons emerging from the anode opening in the HCD and to scan the focused beam in a raster configuration across the surface of the window. We have found that the simplicity of using the control grid 36 with anode grid 46 as the spreading means makes this method preferred. The amount of beam spreading is determined by (1) the distance across the gap between the control grid 36 and anode grid 46, (2) the ratio of areas of the control grid to the anode grid, and (3) the degree of curvature of the control grid and anode grid, and is readily controlled by varying these parameters.

Although the spreading of the beam was originally devised by us as a means for reducing the heating of the foil window 22, we have found that the diffuse beam of electrons produces ozone with unexpected efficiency when the oxygen-containing atmosphere in which the ozone is generated is moving past the window at high velocities, with especially large amounts of ozone being generated at gas velocities above about 4,000 feet per minute. We have tested a device constructed in accordance with our invention having a 5 × 125cm foil window, the results of which are tabulated below:

TABLE I

| Power Source Voltage KV | Power Source Current mA | $O_3$ PPM (vol) | $O_3$ PPM (wt) | $O_3$ LB/HR | Power Consumpt.* KWH/LB $O_3$ |
|---|---|---|---|---|---|
| 105 | 5 | 75 | 125 | .61 | .86 |
| 110 | 5 | 140 | 233 | 1.13 | .49 |
| 110 | 10 | 280 | 467 | 2.26 | .49 |
| 115 | 5 | 200 | 333 | 1.62 | .35 |
| 120 | 5 | 240 | 400 | 1.94 | .31 |

TABLE I-continued

| Power Source Voltage KV | Power Source Current mA | $O_3$ PPM (vol) | $O_3$ PPM (wt) | $O_3$ LB/HR | Power Consumpt.* KWH/LB $O_3$ |
|---|---|---|---|---|---|
| 125 | 5 | 300 | 500 | 2.42 | .26 |

Feed Gas: Room Air at 1 atm.
Air Velocity = 7925 Feet Per Minute
Air Flow = 1078 Standard Cubic Feet Per Minute

*Power consumption indicated as beam power only, not including power consumed by the pump or inefficiency of power source. At 125 kilovolts and 5 milliamperes, for example, the overall efficiency of this device is 0.826 kilowatt hours per pound of ozone, including pumps, gauges, power supply inefficiencies, etc.

It was also found that when the airflow velocity was reduced the amount of ozone produced at 110 kilovolts and 5 milliamperes decreased markedly:

TABLE II

| Airflow Velocity Ft./Min. | Airflow Volume Ft.$^3$/Min. | Ozone Concentration ppm-Volume | Ozone Production Lb./Hr. |
|---|---|---|---|
| 7925 | 1078 | 140 | 1.13 |
| 7320 | 996 | 50 | 0.40 |
| 3179 | 432 | 40 | 0.14 |
| 1083 | 147 | 50 | 0.06 |

These data illustrate several facets of our invention. The expectation of the prior art was that as the transparency of window material increased with greater beam energy, the employment of narrow, more energetic beams would increase the amount of energy imparted to the oxygen-containing atmosphere as a proportion of the input energy of the HCD and thus produce ozone with greater efficiency than at lower beam energies. It was known that a diffuse, low-energy electron beam is more readily dissipated by window materials than is a narrow, high-energy beam, and that diffuse beams cause less heating and window failure as a result. Apparatus constructed in accordance with our invention displays an electron beam density through the window well below 0.1 mA/cm$^2$, usually in the range 0.005 to 0.05 mA/cm$^2$, as compared with the 0.1–0.5 mA/cm$^2$ beam density usually preferred in other electron beam applications. The ozone generation efficiencies observed do not bear out the expectations of the prior art, inasmuch as our invention exhibits an efficiency an order of magnitude of more superior to the efficiencies provided by prior electron beam ozone generators which have comparable electron beam energies, such as the ozone generator disclosed in U.S. Pat. No. 3,883,413. The spreading of the beam provides window-life advantages without sacrificing ozone generation efficiency.

The data above also demonstrate the lack of a need of any specially-treated oxygen-containing atmosphere in which to generate ozone. Our device does not require an oxygen-enriched air feed to produce ozone at high efficiency, contrary to the preference for pure oxygen disclosed in U.S. Pat. No. 3,702,973 (using a thermionic electron gun) and the use of dry oxygen-enriched gas or pure oxygen in a corona discharge ozonizer as disclosed in U.S. Pat. No. 3,963,625. Corona discharge ozonizers become virtually inoperative above approximately 10 percent humidity at 32° F, whereas devices in accordance with our invention may use feed gas at ambient temperature and humidity. Our invention does not provide for drying the feed gas, thereby saving the energy required to dry the feed gas in other processes.

Another facet of our invention illustrated by the test data is the high ozone generation efficiency provided by rapid gas flow past the electron-transmissive window. When devices in accordance with our invention are operated in a non-moving atmosphere, as would be suggested by the prior art, a space charge accumulates at the window which impedes the transmission of the electron beam produced by the HCD and sharply curtails the production of ozone over time. Electron residence time calculations indicate that appreciable dissipation of the space charge by the movement of the oxygen-containing atmosphere past the window will occur only at supersonic air velocities. The accumulation of a space charge may well account for the low ozone generation efficiency at 1083 and 3179 ft./min. air velocity, but we cannot explain the substantial increase in high-velocity efficiency between 7320 and 7925 ft./min., which is well below supersonic velocity at sea level. High atmospheric velocity, especially above about 7900 feet per minute, appears responsible in considerable measure for the efficiency of producing ozone in accordance with our invention. However, velocities of about 4000 feet per minute and above produce ozone with ample efficiency for our intended uses of our invention.

Additional tests have shown that as electron energy in the beam increases, ozone generation efficiency increases until a dc level electron energy of about 180 kilovolts is reached, at which point efficiency levels off. Below about 100 kilovolts ozone generation is not significantly more efficient than with prior art devices. Although the leveling off of efficiency above about 180 kilovolts is not well understood, it is possible that the incremental increase in window transparency as electron energies exceed 180 kilovolts results in dissociation of as much existing ozone by electron bombardment as the amount of additional ozone that the higher energies create.

We have also observed that the concentration of ozone in the oxygen-containing atmosphere may be increased up to 1,000 times the concentrations disclosed above by recirculating the ozone-containing gas repeatedly past the electron-transmissive window and subjecting the gas thereby to repeated bombardment by electrons.

The foregoing description of the invention has been directed to a particular embodiment in accordance with the requirements of the Patent Act and for purposes of explanation and illustration. It will be apparent, however, to those skilled in the art that many modifications and changes in both apparatus and procedure may be made without departing from the scope and spirit of the invention. For example, it is obvious that by describing our apparatus we have also described a new method of making ozone at unexpectedly high efficiency. Modifications in the apparatus disclosed necessary to satisfy the needs of any particular field installation, whether in scaling the apparatus up in size, or in providing special air handling accessories, or in constructing the apparatus of material chosen for environmental stability, are well within the state of the art. These, and other, modifications of our apparatus and method will be apparent to those skilled in this art. It is our intention in the following claims to cover all such equivalent modifications and variations as fall within the true spirit and scope of the invention.

What is claimed is:

1. Apparatus for generating ozone, comprising:
   a vessel enclosing a volume maintained at an appropriate subatmospheric pressure;

a hollow cathode plasma discharge device disposed within the vessel for producing a beam of electrons;

an electron-transmissive window in the wall of the vessel positioned to receive the beam of electrons and communicating with an oxygen-containing atmosphere;

means within the vessel for speading the beam of electrons produced by the hollow cathode plasma discharge device over substantially the entire surface of the electron-transmissive window to provide an electron beam density below about 0.1mA/cm$^2$; and means for moving the oxygen-containing atmosphere past said window and within a suitable distance therefrom at velocities in excess of about 4000 feet per minute.

2. The apparatus of claim 1 in which the vessel is maintained at a pressure between 5 and about 50 microns.

3. The apparatus of claim 1 in which the dc level electron energy of the beam of electrons is at least about 100 kilovolts and not greater than about 180 kilovolts.

4. The apparatus of claim 1 in which the velocity of the oxygen-containing atmosphere is at least about 7900 feet per minute.

5. The apparatus of claim 1 in which the means for spreading the beam of electrons comprises a control grid in combination with an anode grid of the same degree of curvature as the control grid, wherein (a) the control grid is spaced a predetermined distance from the anode grid;

(b) the area of the control grid is in a predetermined ratio to the area of the anode grid; and (c) the control grid and anode grid have a predetermined degree of curvature, sufficient to cause spreading of the beam of electrons over substantially the entire surface of the electron-transmissive window.

6. The apparatus of claim 5 in which the dc level electron energy of the beam of electrons is at least about 100 kilovolts and not greater than about 180 kilovolts and in which the vessel is maintained at a pressure between about 5 and about 50 microns.

7. The apparatus of claim 6 in which the velocity of the oxygen-containing atmosphere is at least about 7900 feet per minute.

8. The apparatus of claim 1 wherein the means for moving the oxygen-containing atmosphere past the window comprises:

duct means communicating with the electron-transmissive window; and blower means connected with the duct means for moving the oxygen-containing atmosphere through the duct means past the electron-transmissive window.

9. The apparatus of claim 8 in which the oxygen-containing atmosphere has a velocity of at least about 7900 feet per minute.

10. The apparatus of claim 6 in which the electron current density through the electron-transmissive window is at least about 0.005 milliamperes per square centimeter and not greater than about 0.10 milliamperes per square centimeter.

* * * * *